(12) United States Patent
Yoo

(10) Patent No.: US 8,505,966 B2
(45) Date of Patent: Aug. 13, 2013

(54) AIRBAG MODULE

(75) Inventor: Wan-Dong Yoo, Suwon-si (KR)

(73) Assignee: Autoliv Development AB, Vargarda (SE)

( * ) Notice: Subject to any disclaimer, the term of this patent is extended or adjusted under 35 U.S.C. 154(b) by 14 days.

(21) Appl. No.: 13/266,506

(22) PCT Filed: Apr. 19, 2010

(86) PCT No.: PCT/KR2010/002410
§ 371 (c)(1),
(2), (4) Date: Oct. 27, 2011

(87) PCT Pub. No.: WO2010/128762
PCT Pub. Date: Nov. 11, 2010

(65) Prior Publication Data
US 2012/0049491 A1 Mar. 1, 2012

(30) Foreign Application Priority Data

May 6, 2009 (KR) .......................... 10-2009-0039193

(51) Int. Cl.
*B60R 21/233* (2006.01)
*B60R 21/214* (2011.01)
(52) U.S. Cl.
USPC ...................................... 280/730.1; 280/729
(58) Field of Classification Search
CPC .. B60R 21/214; B60R 21/233; B60R 21/239; B60R 2021/23153; B60R 2021/23921
USPC ................ 280/729, 730.1, 739, 743.1, 743.2
See application file for complete search history.

(56) References Cited

U.S. PATENT DOCUMENTS

| 2,834,609 | A | * | 5/1958 | Bertrand | 280/739 |
| 3,606,377 | A | * | 9/1971 | Martin | 280/741 |
| 3,802,719 | A | * | 4/1974 | Brown | 280/729 |
| 6,554,313 | B2 | * | 4/2003 | Uchida | 280/729 |

(Continued)

FOREIGN PATENT DOCUMENTS

| DE | 202006005872 U1 * | 7/2006 |
| JP | 2003-034208 A | 2/2003 |
| KR | 1020080008460 A | 1/2008 |
| WO | 2008-124499 A1 | 10/2008 |

OTHER PUBLICATIONS

International Search Report for PCT/KR2010002410, ISA/KR, Seo-gu, Daejeon 302-701, Republic of Korea 302-701, mailed Dec. 29, 2010.

*Primary Examiner* — Joseph Rocca
(74) *Attorney, Agent, or Firm* — Harness, Dickey & Pierce, P.L.C.

(57) ABSTRACT

An airbag module includes an airbag cushion, an inflator and a housing. The inflator injects gas into the airbag cushion when a vehicle is in collision, so that the airbag cushion is inflated and deployed. The housing houses the airbag cushion, which is folded before deployment, and the inflator. When the airbag cushion is deployed from the housing, the airbag cushion forms a hard chamber and a soft chamber that are defined by a partition. The hard chamber is supplied with gas by the inflator and is positioned in the upper front of the airbag cushion. The soft chamber is supplied with gas by the hard chamber via a connecting hole formed in the partition and is positioned in the rear of the airbag cushion. A vent hole for exhausting gas to the outside is formed in the soft chamber.

5 Claims, 2 Drawing Sheets

(56) References Cited

U.S. PATENT DOCUMENTS

| | | |
|---|---|---|
| 6,866,291 B2 | 3/2005 | Abe et al. |
| 6,966,579 B2 * | 11/2005 | Schneider et al. .......... 280/743.2 |
| 7,695,002 B2 | 4/2010 | Choi |
| 7,762,576 B2 * | 7/2010 | Cho .............................. 280/729 |
| 7,862,074 B2 * | 1/2011 | Deng et al. ................. 280/730.1 |
| 7,918,480 B2 * | 4/2011 | Kwon et al. ................ 280/728.2 |
| 7,926,840 B1 * | 4/2011 | Choi ........................... 280/730.1 |
| 8,002,309 B2 * | 8/2011 | Kim et al. ...................... 280/729 |
| 8,328,228 B2 * | 12/2012 | Lee et al. ................... 280/730.1 |
| 2005/0006880 A1 * | 1/2005 | Nakayama ................. 280/730.1 |
| 2006/0043712 A1 * | 3/2006 | Hakki et al. .................. 280/735 |

\* cited by examiner

US 8,505,966 B2

AIRBAG MODULE

CROSS-REFERENCE TO RELATED APPLICATIONS

This application is a 371 U.S. National Stage of International Application No. PCT/KR2010/002410, filed Apr. 19, 2010, which application claims priority to Korean Patent Application No. KR 10-2009-0039193, filed May 6, 2009. The entire disclosures of the above applications are incorporated herein by reference.

TECHNICAL FIELD

The invention is related to an airbag module, and more particularly, to a roof airbag module for a passenger on the rear seat of a vehicle.

BACKGROUND ART

Airbag modules can be classified into various types according to installation locations thereof. In this regard, types of airbag modules include steering wheel airbags, dashboard airbags, roof airbags, etc., and various airbag modules for each of the types have been introduced.

FIG. 1 shows an example of a roof airbag module 100 including an airbag cushion 110. Referring to FIG. 1, the roof airbag module 100 is installed on the inner surface of a roof 10 of a vehicle to protect a passenger 30 (FIG. 1 illustrates a dummy, which is used instead of a real passenger for experimenting airbag inflation) on the rear seat 20 of the vehicle.

When a signal indicating that the vehicle is in collision is detected, an inflator (not shown), which is disposed inside a housing 120 of the roof airbag module 100, injects gas into the airbag cushion 110, so that the airbag cushion 110 is deployed. The airbag cushion 110 includes a first chamber 111, which is deployed in a right-triangular shape having the hypotenuse facing toward the lower front (a direction between the X axis direction and −Y axis direction in FIG. 1), and a second chamber 112, which is deployed to protrude rearward of the first chamber 111 (the −X axis direction).

The second chamber 112 protrudes rearward to support the head 31 of the passenger 30 as soon as possible when the vehicle is in collision, without waiting until the head 31 is jerked forward. However, since there is a large opening 112a formed between the second chamber 112 and the first chamber 111, the first chamber 111 and the second chamber 112 do not function differently even momentarily so as to protect the passenger more efficiently.

As gas from the inflator diminishes and the airbag cushion 110 is pressed by the head 31 of the passenger 30, gas within the deployed airbag cushion 110 is exhausted to the outside via an vent hole 111a, and internal pressure of the airbag cushion 110, and more particularly, internal pressure of the first chamber 111 decreases.

In the airbag module 100 described above, the shape of the first chamber 111 is a right triangle extending downward, the vent hole 111a is positioned in front of the first chamber 111, and force is exerted frontward (X direction) onto the first chamber 111 by the passenger 30. Therefore, a middle portion F of the front portion (a portion corresponding to the hypotenuse of the right triangle) of the first chamber 111 close to the vent hole 111a is folded when the internal pressure decreases, and thus the passenger 30 cannot be supported for a sufficient time period. As a result, even if the airbag cushion 110 is deployed when a vehicle is in collision, a passenger, and more particularly, a passenger without a seatbelt on might not be protected sufficiently.

DISCLOSURE OF INVENTION

Technical Problem

Airbag module of the prior art does not protect a passenger sufficiently and efficiently.

Solution to Problem

The invention provides an airbag module which can maximize safety of a passenger by supporting the passenger as long as possible.

The airbag module comprises:
an airbag cushion;
an inflator which injects gas into the airbag cushion when a vehicle is in collision, so that the airbag cushion is inflated and deployed; and
a housing which houses the airbag cushion, which is folded before deployment, and the inflator,
wherein, when the airbag cushion is deployed from the housing, the airbag cushion forms a hard chamber and a soft chamber that are defined by a partition,
the hard chamber is supplied with gas by the inflator and is positioned in the upper front of the airbag cushion,
the soft chamber is supplied with gas by the hard chamber via a connecting hole formed in the partition and is positioned in the rear of the airbag cushion, and
a vent hole for exhausting gas to the outside is formed in the soft chamber.

Advantageous Effects of Invention

A passenger can be protected sufficiently and efficiently by the airbag module of the invention disclosed herein.

BEST MODE FOR CARRYING OUT THE INVENTION

Hereinafter, embodiments of the invention will be described in detail in reference to FIGS. 2 through 4.

Figure 2:
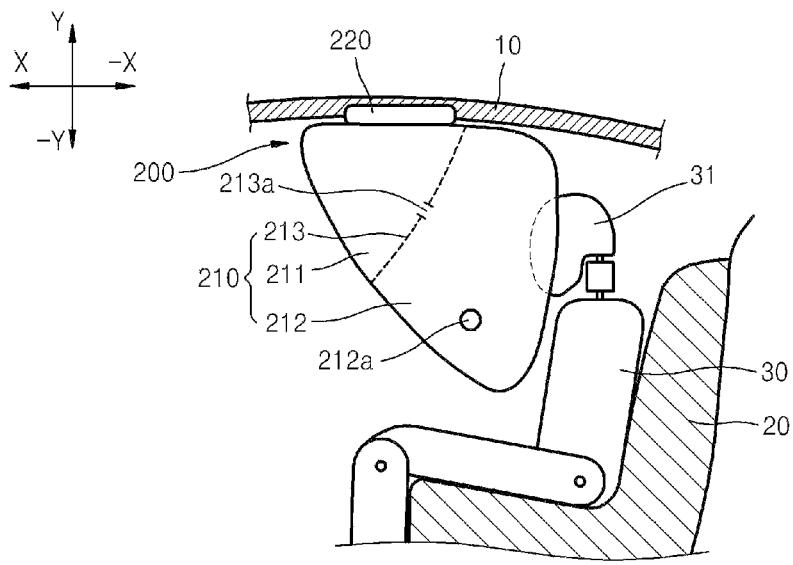
FIG. 2 is a side view of an airbag module including an airbag cushion, according to an embodiment of the invention, in a state in which the airbag cushion is deployed.

FIG. 2 is a side view of an airbag module 200 including an airbag cushion 210, according to an embodiment of the invention, in a state in which the airbag cushion 210 is deployed. Referring to FIG. 2, the airbag module 200 according to the present embodiment includes a housing 220, an inflator (not shown), and the airbag cushion 210.

The housing 220 houses the airbag cushion 210, which is folded before deployment, and the inflator, and is installed on the inner surface of a roof 10 of a vehicle. When the vehicle is in collision, the bottom portion of the housing 220 may be opened or torn due to inflation of the airbag cushion 210, so that the airbag cushion 210 may be deployed out of the housing 220.

The inflator is disposed inside the housing 220. Since the configuration of the inflator is well known to those in the art, a detailed description thereof is not provided here. Generally, an inflator receives a signal from a sensor for detecting vehicle collisions, and rapidly evaporates a solid material in the inflator. An airbag cushion is inflated and deployed by gas generated by the evaporation of the solid material.

The airbag cushion 210 is folded and stored inside the housing 220 in a normal situation, and is inflated and deployed by a gas when a signal indicating vehicle collision is received. When the airbag cushion 210 is deployed out of the housing 220, the airbag cushion 210 forms a hard chamber 211 and a soft chamber 212, wherein the hard chamber 211 and the soft chamber 212 are separated from each other by a partition 213. The hard chamber 211 and the soft chamber 212 may be fabricated separately and combined later. Alternatively, the outer cover of the airbag cushion 210 may be fabricated as a single body, and then the partition 213 may be sewn inside the airbag cushion 210.

Gas is supplied directly into the hard chamber 211 by the inflator, and the hard chamber 211 is positioned in the upper front (a direction between the X axis direction and the Y axis direction in FIG. 2) of the airbag cushion 210 when the airbag cushion 210 is deployed by the gas. Furthermore, the gas is supplied into the soft chamber 212 via a connecting hole 213a, formed in the partition 213, from the hard chamber 211, and the soft chamber is positioned in the rear part of the airbag cushion 210 (the −X axis direction in FIG. 2) when the airbag cushion 210 is deployed by the gas. Gas supplied into the soft chamber 212 is exhausted to the outside via a vent hole 212a as the soft chamber 212 is pressed by the head 31 of a passenger 30 on a rear seat 20 of the vehicle.

While gas is directly supplied into the hard chamber 211 from the inflator, the hard chamber 211 has no hole opened to the outside. Therefore, even when the airbag cushion 210 is deployed or the passenger 30 presses the soft chamber 212, the hard chamber 211 maintains high internal pressure. Thus, the hard chamber 211 can maintain its shape and position even when the airbag cushion 210 is pressed by the passenger 30.

When deployed, the position and the shape of the hard chamber 211 are defined by the partition 213, and thus the partition 213 may be disposed to extend from the lower front of the airbag cushion 210 (a direction between the X axis direction and the −Y axis direction) to the upper rear (a direction between the −X axis direction and the Y axis direction) of the same when the airbag cushion 210 is deployed.

Figure 1:
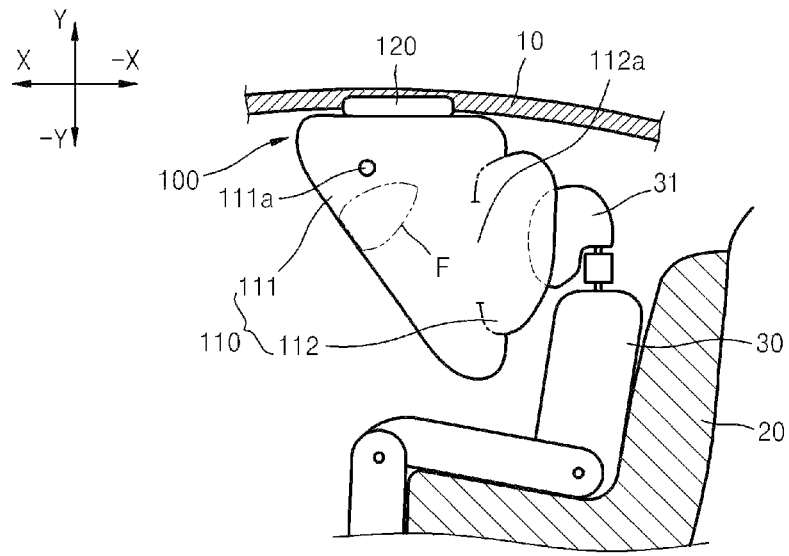
FIG. 1 is a side view of a conventional airbag module including an airbag cushion, in a state in which the airbag cushion is deployed.

When the vehicle is in a hard collision and the passenger 30 is not wearing a seatbelt, the passenger 30 tends to be jerked forward (in a direction between the X axis and the Y axis). Here, when the hard chamber 211 of the airbag cushion 210, which is configured as described above, maintains its position and shape, it not only can prevent the passenger 30 from colliding with the inner surface of the roof 10 of the vehicle or the housing 220 of the airbag module 200, but also can prevent the passenger 30 from being flung into the front seats past the housing 220. Thus, safety of the passenger 30 can be significantly improved. The advantage of the invention cannot be expected from the conventional airbag cushion 110 illustrated in FIG. 1.

The vent hole 212a is disposed such that gas in the soft chamber 212 can be exhausted to the outside via the vent hole 212a as the soft chamber 212 is pressed by the head 31 of the passenger 30. Thus, the soft chamber 212 can be deformed suitably to protect the passenger 30, and more particularly, the neck of the passenger 30. However, when the passenger 30 excessively presses the soft chamber 212, not only the internal pressure of the soft chamber 212 decreases, but also the hard chamber 211 may be deformed as gas within the hard chamber 211 sequentially passes through the connecting hole 213a and the vent hole 212a and is exhausted to the outside.

Figure 3:
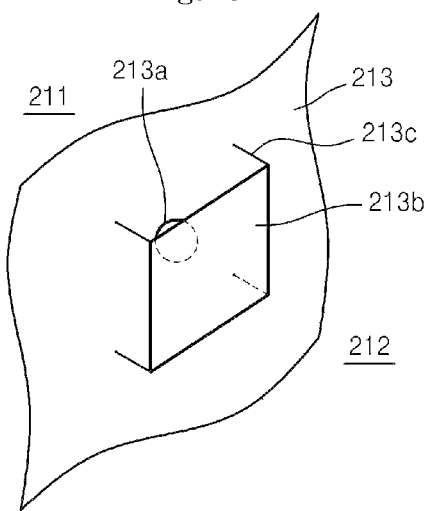
FIGS. 3 and 4 are diagrams showing modifications of the embodiment shown in FIG. 2, each of which shows a configuration in which a blocking layer is added to a partition of an airbag cushion.
Figure 4:
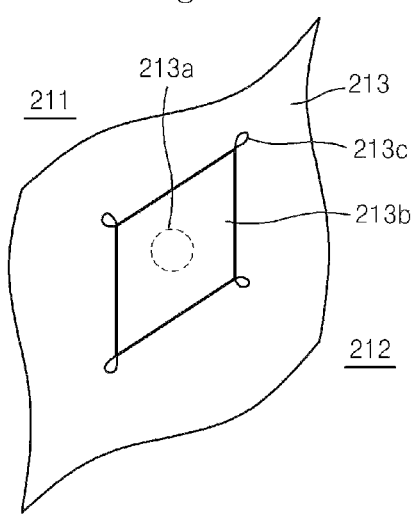

In these circumstances, a blocking layer 213b illustrated in FIGS. 3 and 4 may be used for protection of the passenger 30. The blocking layer 213b is loosely connected to the partition 213 via a tether 213c on the soft chamber 212 side of the connecting hole 213a.

When the airbag cushion 210 is deployed, the blocking layer 213b is separated from the connecting hole 213a due to the pressure of gas within the hard chamber 211, and thus the gas can be transferred into the soft chamber 212 (refer to FIG. 3).

Furthermore, when excessive pressure is applied by the passenger 30 to the soft chamber 212 after the airbag cushion 210 is deployed, the internal pressure of the soft chamber 212 temporarily becomes higher than that of the hard chamber 211 due to the pressure from the passenger 30. In extreme cases, the body of the passenger 30 directly presses the blocking layer 213b (while a layer defining the soft chamber 212 is disposed between the passenger and the blocking layer), so that the blocking layer 213b blocks the connecting hole 213a. Thus, gas cannot be transferred from the soft chamber 212 into the hard chamber 211, at least temporarily (refer to FIG. 4).

Accordingly, as the connecting hole 213a is blocked at least temporarily, internal pressure of the hard chamber 211 can be maintained for a longer period of time. In other words, the position and the shape of the hard chamber 211 can be maintained for a longer period of time, and thus further safety of the passenger can be guaranteed.

Although FIG. 2 illustrates that the vent hole 212a is formed in a lower side of the soft chamber 212, the vent hole 212a can also be formed at a different location according to a particular design purpose; e.g. an upper side of the soft chamber 212.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

An airbag module according to the invention can maximize safety of a passenger by supporting the passenger as long as possible.

The invention claimed is:
1. An airbag module comprising:
an airbag cushion;
an inflator for injecting gas into the airbag cushion and inflating the airbag cushion;
a housing which houses the airbag cushion before deployment;
a partition separating the airbag cushion upon deployment such that the airbag cushion forms a hard chamber and a soft chamber separated by the partition, the partition extending from a lower front of the airbag cushion to an upper rear of the airbag cushion when deployed, the hard chamber supplied with gas by the inflator and positioned in an upper front of the airbag cushion, the soft chamber supplied with gas by the hard chamber via a connecting hole formed in the partition and positioned in a rear of the airbag cushion; and a blocking layer loosely connected to the partition via a tether, the blocking layer disposed on a soft chamber side of the connecting hole when the airbag is deployed, the blocking layer is separated from the connecting hole due to a pressure of gas such that the gas can be transferred from the hard chamber into the soft chamber, and such that when the soft chamber is pressed by a passenger after the airbag cushion is deployed, the blocking layer blocks the connecting hole so that gas is at least temporarily prevented to transfer from the soft chamber into the hard chamber.

2. The airbag module of claim 1, wherein vent hole is formed in a lower side of the soft chamber.

3. An airbag module comprising:

an airbag cushion;

a partition separating the airbag cushion upon deployment such that the airbag cushion forms a hard chamber and a soft chamber separated by the partition, the partition extending from a lower front of the airbag cushion to an upper rear of the airbag cushion when deployed, the hard chamber supplied with gas by the inflator and positioned in an upper front of the airbag cushion, the soft chamber supplied with gas by the hard chamber via a connecting hole formed in the partition and positioned in a rear of the airbag cushion; and a blocking layer loosely connected to the partition via a tether, the blocking layer disposed on a soft chamber side of the connecting hole when the airbag is deployed, the blocking layer is separated from the connecting hole due to a pressure of gas such that the gas can be transferred from the hard chamber into the soft chamber, and such that when the soft chamber is pressed by a passenger after the airbag cushion is deployed, the blocking layer blocks the connecting hole so that gas is at least temporarily prevented to transfer from the soft chamber into the hard chamber.

4. The airbag module of claim 3, wherein a vent hole is formed in a lower side of the soft chamber.

5. The airbag module of claim 3, further comprising a housing which houses the airbag cushion before deployment.

* * * * *